United States Patent
Kozaki et al.

(10) Patent No.: US 11,675,171 B2
(45) Date of Patent: Jun. 13, 2023

(54) IMAGING DEVICE AND IMAGING OPTICAL SYSTEM

(71) Applicant: Vecnos Inc., Kanagawa (JP)

(72) Inventors: Yukio Kozaki, Tokyo (JP); Hiroyuki Satoh, Tokyo (JP)

(73) Assignee: RICOH CO., LTD, Tokyo (JP)

( * ) Notice: Subject to any disclaimer, the term of this patent is extended or adjusted under 35 U.S.C. 154(b) by 576 days.

(21) Appl. No.: 16/789,529

(22) Filed: Feb. 13, 2020

(65) Prior Publication Data
US 2020/0257094 A1 Aug. 13, 2020

(30) Foreign Application Priority Data

Feb. 13, 2019 (JP) ............... JP2019-023805
Feb. 6, 2020 (JP) ............... JP2020-019171

(51) Int. Cl.
| | |
|---|---|
| *G02B 13/06* | (2006.01) |
| *G02B 27/64* | (2006.01) |
| *H04N 23/51* | (2023.01) |
| *H04N 23/698* | (2023.01) |
| *G02B 5/02* | (2006.01) |

(52) U.S. Cl.
CPC ............. *G02B 13/06* (2013.01); *G02B 27/64* (2013.01); *H04N 23/51* (2023.01); *H04N 23/698* (2023.01); *G02B 5/0278* (2013.01)

(58) Field of Classification Search
None
See application file for complete search history.

(56) References Cited

U.S. PATENT DOCUMENTS

| | | | |
|---|---|---|---|
| 10,295,797 B2 | 5/2019 | Masuda et al. | |
| 2004/0179273 A1* | 9/2004 | Ishikawa | G02B 15/143507 359/680 |

(Continued)

FOREIGN PATENT DOCUMENTS

| | | | |
|---|---|---|---|
| CN | 205880490 U | * | 1/2017 |
| CN | 205880490 U | | 1/2017 |

(Continued)

OTHER PUBLICATIONS

Extended Search Report issued in European Application No. 20157102. 3, dated Jul. 13, 2020, 6 pages.

*Primary Examiner* — Shadan E Haghani
(74) *Attorney, Agent, or Firm* — Eversheds Sutherland (US) LLP

(57) ABSTRACT

An imaging device includes: a plurality of optical systems each forming an image of a subject; a plurality of imaging sensors corresponding to the respective plurality of optical systems; and a housing part that houses the plurality of optical systems and the plurality of imaging sensors, the housing part having a peripheral surface along a circumferential direction about a reference axis, wherein: at least two of the plurality of optical systems each have: a peripheral lens arranged along the peripheral surface and located closest to an object; and a first optical path, the first optical paths of the at least two optical systems intersecting each other; and each of the peripheral lenses has a longitudinal direction, the peripheral lens being arranged along the peripheral surface such that the longitudinal direction extends along the reference axis.

17 Claims, 13 Drawing Sheets

(56) References Cited

U.S. PATENT DOCUMENTS

| | | | |
|---|---|---|---|
| 2005/0168616 A1* | 8/2005 | Rastegar | H04N 5/23238 348/335 |
| 2014/0364694 A1* | 12/2014 | Avron | A61B 1/00181 600/164 |
| 2015/0373266 A1 | 12/2015 | Hsieh et al. | |
| 2016/0352982 A1* | 12/2016 | Weaver | G03B 37/04 |
| 2020/0366839 A1* | 11/2020 | Kawasaki | H04N 5/23238 |
| 2020/0413093 A1* | 12/2020 | Newman | H04N 19/146 |

FOREIGN PATENT DOCUMENTS

| | | |
|---|---|---|
| EP | 3343895 A1 | 7/2018 |
| JP | 2002-314867 A | 10/2002 |
| JP | 2013-066163 A | 4/2013 |
| JP | 6142467 B2 | 6/2017 |
| JP | 2018-136486 A | 8/2018 |
| JP | 2018-136487 A | 8/2018 |
| JP | 2018-136488 A | 8/2018 |

* cited by examiner

Fig. 5

IMAGING DEVICE AND IMAGING OPTICAL SYSTEM

BACKGROUND

Field

The present invention relates to an imaging device and an imaging optical system.

Description of Related Art

JP2013-066163 A and JP6142467 B each disclose an example of an omnidirectional imaging device (omnidirectional camera), which includes a combination of two imaging optical systems having the same structure, the imaging optical systems each including a wide-angle lens having an angle of view of greater than 180 degrees and an imaging sensor that images an image from the wide-angle lens, and the imaging device synthesizes images imaged by the respective imaging optical systems to obtain an image in a solid angle of $4\pi$ radian.

In the technical field of imaging devices, research and development is being conducted in order to meet the needs for size reduction while maintaining excellent imaging performance. However, the imaging devices in the above-mentioned patent documents do not completely meet such needs and they therefore still have room for improvement.

SUMMARY

The present invention has been made in light of the above-mentioned problem and an object of the present invention is to provide an imaging device and an imaging optical system capable of meeting the needs for size reduction while maintaining excellent imaging performance.

An imaging device according to an aspect of the present invention includes: a plurality of optical systems each forming an image of a subject; a plurality of imaging sensors corresponding to the respective plurality of optical systems; and a housing part that houses the plurality of optical systems and the plurality of imaging sensors, the housing part having a peripheral surface along a circumferential direction about a reference axis, wherein: at least two of the plurality of optical systems each have: a peripheral lens arranged along the peripheral surface and located closest to an object; and a first optical path, the first optical paths of the at least two optical systems intersecting each other; and each of the peripheral lenses has a longitudinal direction, the peripheral lens being arranged along the peripheral surface such that the longitudinal direction extends along the reference axis.

BRIEF DESCRIPTION OF DRAWINGS

FIG. 5 is a diagram showing a positional relationship between an end surface optical system, an end surface imaging sensor, a peripheral optical system, a peripheral imaging sensor and the hexagonal glass in an enlarged manner.

DETAILED DESCRIPTION

Figure 1A:
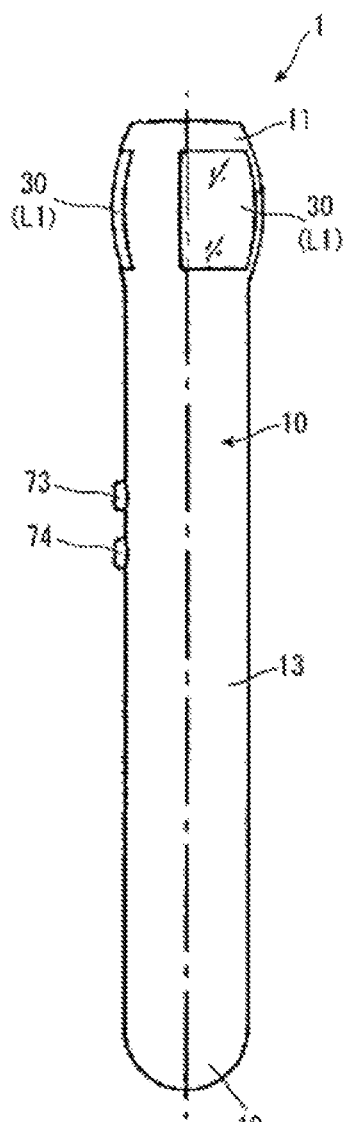
FIGS. 1A to 1C are diagrams each showing an external configuration of an imaging device according to an embodiment.
Figure 1B:
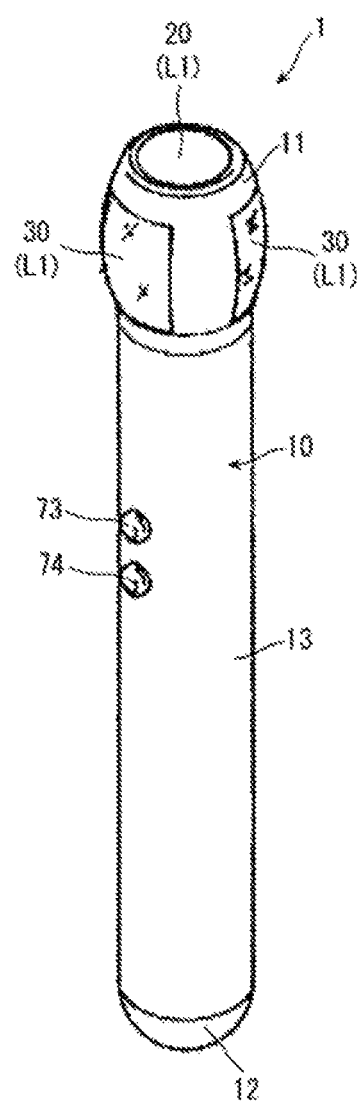
Figure 1C:
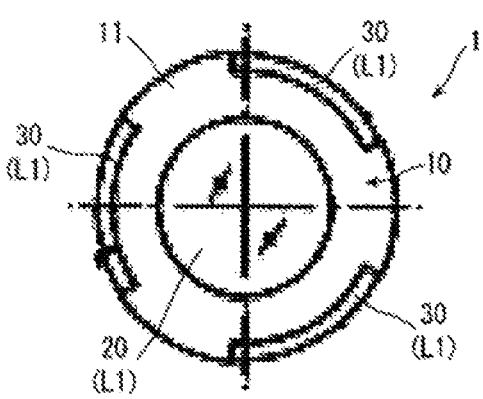

FIGS. 1A to 1C are diagrams each showing an external configuration of an imaging device 1 according to an embodiment of the present invention. FIG. 1A is a side view, FIG. 1B is a perspective view and FIG. 1C is a plan view.

As shown in FIGS. 1A to 1C, the imaging device 1 has a housing 10 that extends in a longitudinal direction. The following description will provide explanation assuming that the longitudinal direction of the housing 10 corresponds to the vertical direction, and the basic posture of the housing 10 is a state in which one end in the longitudinal direction thereof is oriented upward and the other end in the longitudinal direction thereof is oriented downward.

The housing 10 has a circumferential protruding part 11 located on its upper end (one end in the longitudinal direction), the circumferential protruding part 11 having a rounded shape that protrudes circumferentially. The housing 10 has a downward protruding part 12 located on its lower end (the other end in the longitudinal direction), the downward protruding part 12 having a rounded shape that protrudes downward. The housing 10 has a constant-diameter part 13 located in the middle between the circumferential protruding part 11 and the downward protruding part 12 in the vertical direction (longitudinal direction), the constant-diameter part 13 having a constant diameter in the circumferential direction. The constant-diameter part 13 constitutes a grip to be gripped by a user during image capturing using the imaging device 1. It should be noted that the part provided in the middle between the circumferential protruding part 11 and the downward protruding part 12 in the vertical direction (longitudinal direction) (hereinafter referred to as the "middle part") is not limited to the constant-diameter part 13. For example, the middle part may be tapered such that the diameter thereof decreases downward. Alternatively, the middle part may have a shape whose radius varies in a stepwise manner (in two or three steps). Further alternatively, the middle part may have other shapes than the columnar shape and, for example, a triangular prism or a quadrangular prism may be employed. In other words, the shape of the middle part which is cut along a plane is not limited to one shape.

By providing the downward protruding part 12 on the lower end surface of the housing 10, it is possible to prevent the housing 10 from being placed on a mounting surface (e.g. a table) by a user while maintaining the basic posture of the housing 10. If the lower end surface of the housing 10 is flat and the housing 10 is placed on the mounting surface, due to a very small contact area between the lower end surface of the housing 10 and the mounting surface, the housing 10 may fall down due to minor causes such as an accidental contact by a person or an object, or by a strong wind during outdoor image capturing, which may cause the housing 10 to collide against the mounting surface, resulting in damage to the imaging device 1 (such as cracks in a lens). In the present embodiment, such damage due to the above-mentioned minor causes can be prevented by preventing the housing 10 from being placed on the mounting surface by the user while maintaining the basic posture of the housing 10.

Figure 2:
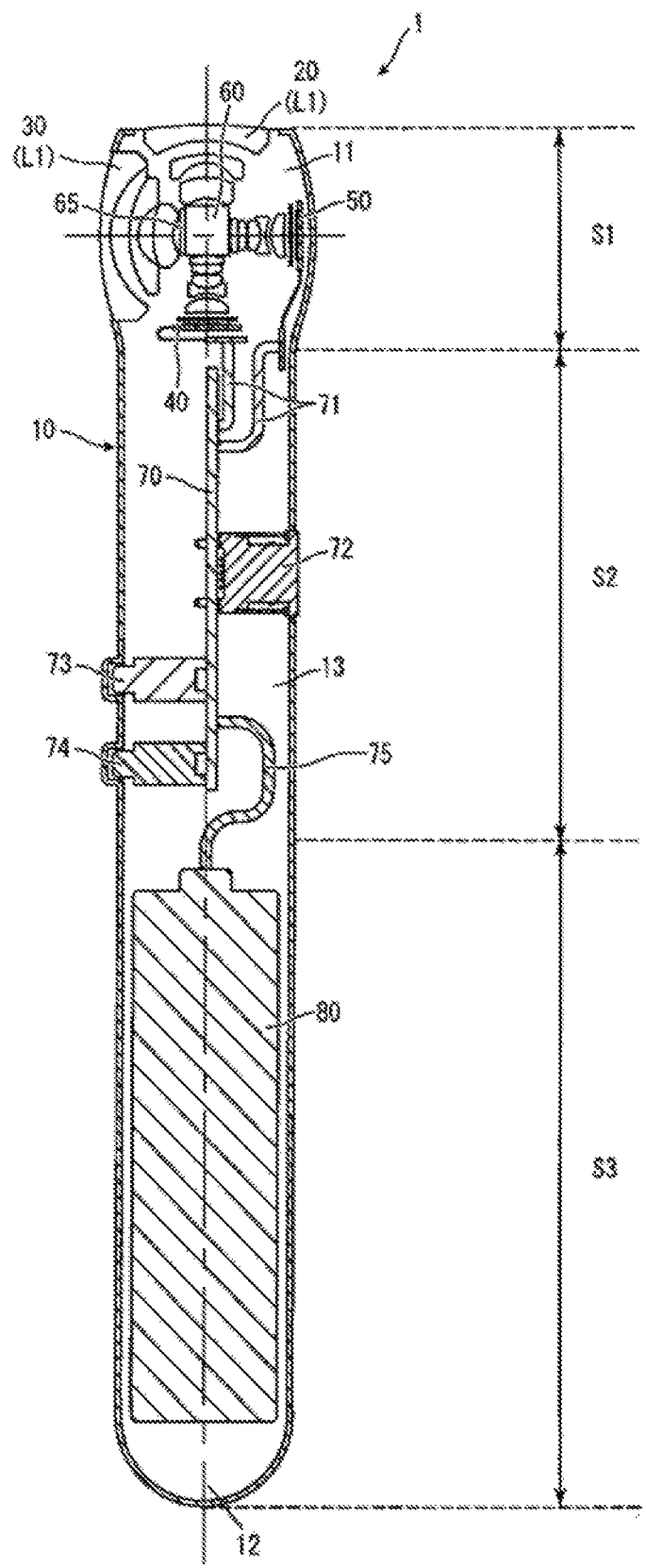
FIG. 2 is a cross-section view showing an internal configuration of the imaging device according to the present embodiment.

FIG. 2 is a cross-sectional view showing an internal configuration of the imaging device 1 according to the present embodiment.

As shown in FIG. 2, the imaging device 1 has a first region S1, a second region S2 and a third region S3 which extend in the vertical direction (longitudinal direction). The first region S1 is located on the upper end side (the one end side in the longitudinal direction) of the imaging device 1, the second region S2 is located in the middle in the vertical direction (longitudinal direction) of the imaging device 1, and the third region S3 is located on the lower end side (the other end side in the longitudinal direction) of the imaging device 1.

One optical system (end surface optical system) 20 with part thereof exposed from an upper surface (an end surface in the longitudinal direction) of the housing 10 and three optical systems (peripheral optical systems) 30 with parts thereof being exposed from a peripheral surface intersecting the vertical direction (longitudinal direction) of the housing 10 are arranged in the first region (one region in the longitudinal direction) S1 of the imaging device 1. Further, one imaging sensor (end surface imaging sensor) 40 on which an image from the one optical system (end surface optical system) 20 is formed, and three imaging sensors (peripheral imaging sensors) 50 on which images from the three optical systems (peripheral optical systems) 30 are formed, are also arranged in the first region S1. The imaging sensor 40 is held by an imaging sensor holding substrate 41 and the imaging sensors 50 are held by respective imaging sensor holding substrates 51. In this way, the four optical systems 20, 30 and four imaging sensors 40, 50, on which images from the respective four optical systems 20, 30 are formed, are arranged in the first region S1.

In the first region S1 of the imaging device 1, a hexagonal glass (hexagonal prism) 60 is arranged so as to be located on optical paths of the four optical systems 20, 30 and the hexagonal glass 60 serves as a common transmissive optical element which transmits subject light beams passing through the four optical systems 20, 30. The hexagonal glass 60 may be, for example, an optical element only having a transmissive function without having optical functions such as spectroscopic function, refraction function and polarization function.

Figure 3:
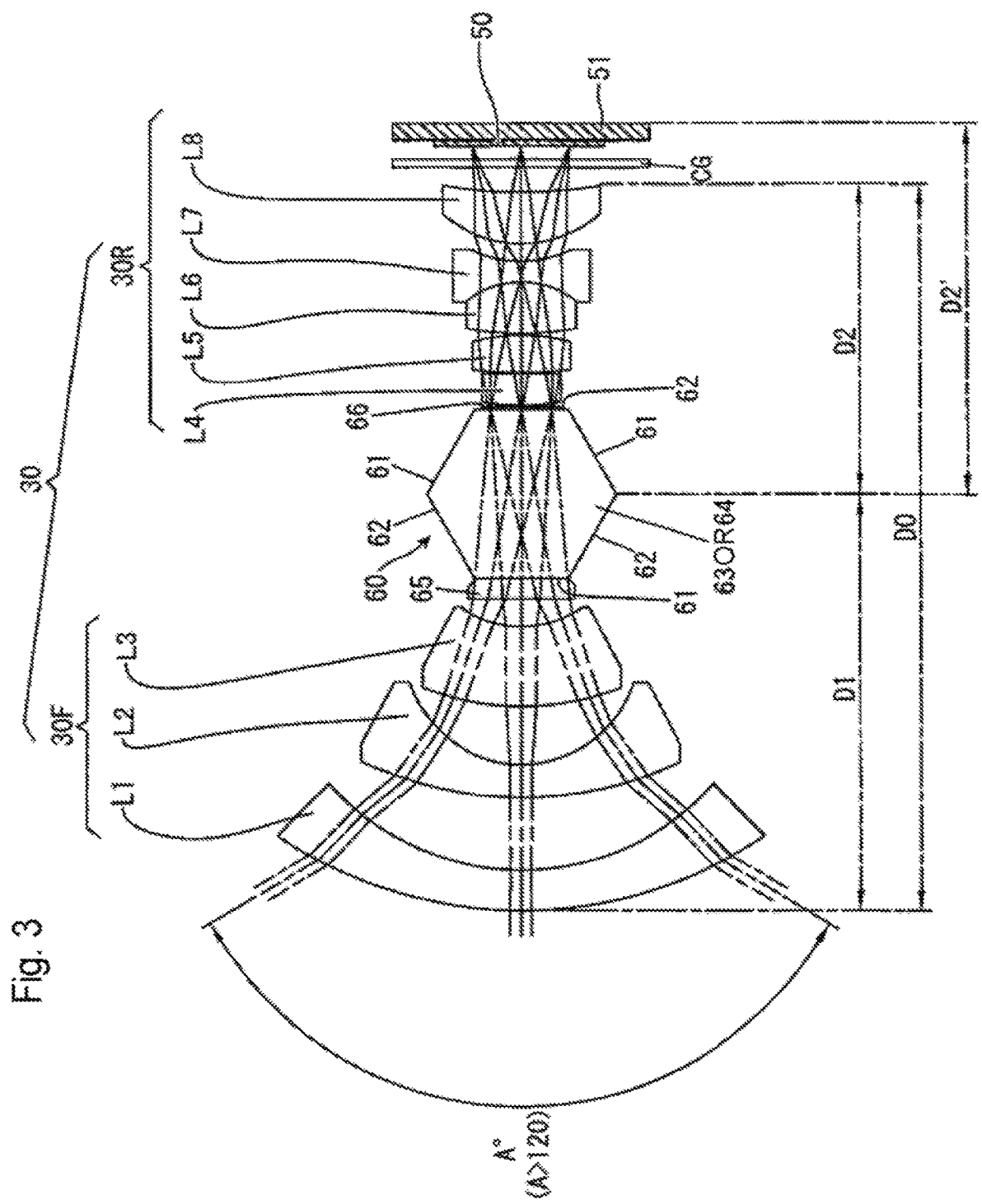
FIG. 3 is a diagram showing an optical design of a peripheral optical system, a peripheral imaging sensor and a hexagonal glass in an enlarged manner.
Figure 4:
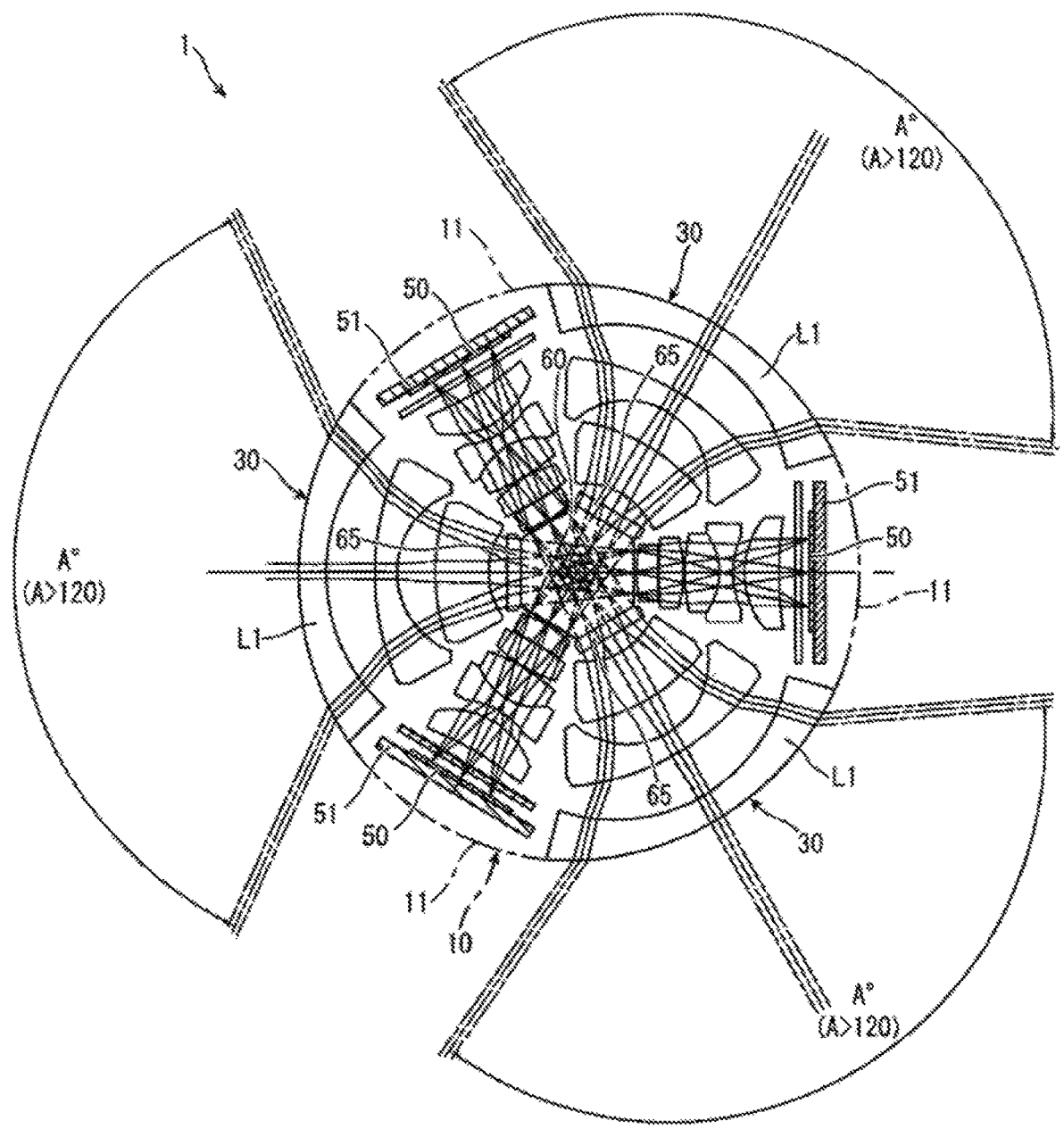
FIG. 4 is a diagram showing a positional relationship between peripheral optical systems, peripheral imaging sensors and the hexagonal glass in an enlarged manner.
Figure 5:
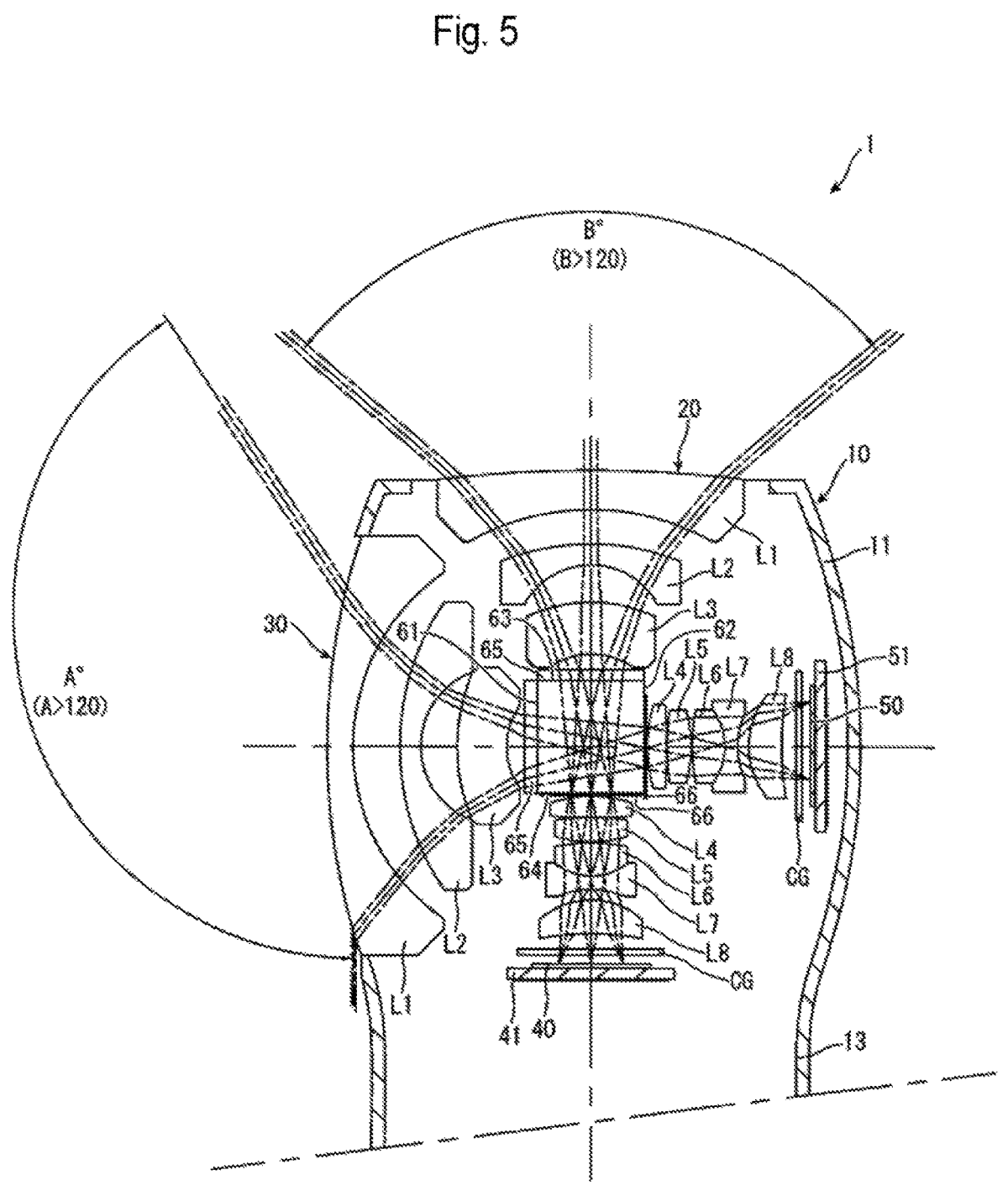

Referring to FIGS. 3-5, the following description will describe the configurations of the four optical systems (the end surface optical system and the peripheral optical systems) 20, 30, the four imaging sensors (the end surface imaging sensor and the peripheral imaging sensors) 40, 50 and the hexagonal glass 60, as well as their positional relationships.

The four optical systems (the end surface optical system and the peripheral optical systems) 20, 30 and the hexagonal glass 60 constitute an "imaging optical system" of the present embodiment.

FIG. 3 is a diagram showing an optical design of an optical system (peripheral optical system) 30, an imaging sensor (peripheral imaging sensor) 50 and the hexagonal glass 60, in an enlarged manner. Although FIG. 3 only illustrates one set of an optical system (peripheral optical system) 30 and an imaging sensor (peripheral imaging sensor) 50 from among three such sets, the other sets also have the same optical design. In addition, the optical system (end surface optical system) 20 and the imaging sensor (end surface imaging sensor) 40 have the same optical design as that of the optical system (peripheral optical system) 30 and the imaging sensor (peripheral imaging sensor) 50 or an optical design which is scaled to be larger.

As shown in FIG. 3, the optical system (peripheral optical system) 30 includes a front lens group 30F and a rear lens group 30R with the hexagonal glass 60 sandwiched therebetween, the front lens group 30F being located on the object side with respect to the hexagonal glass 60, and the rear lens group 30R being located on the image side with respect to the hexagonal glass 60.

The front lens group 30F includes a first lens L1, a second lens L2 and a third lens L3 in the order of mention from the object side toward the image side. The rear lens group 30R includes a fourth lens L4, a fifth lens L5, a sixth lens L6, a seventh lens L7 and an eighth lens L8 in the order of mention from the object side toward the image side. A cover glass CG is arranged between the rear lens group 30R (the eighth lens L8) and the imaging sensor 50.

The term "plurality of lenses" herein may refer to the first lenses L1, which are each located closest to the object, in each of the one optical system (end surface optical system) 20 and the three optical systems (peripheral optical system) 30. Each of the first lenses L1 serving as the "plurality of lenses" is exposed from an outer surface of the housing 10 of the imaging device 1. The first lens L1 of the optical system (end surface optical system) 20 may be referred to as an "end surface lens," while the first lens L1 of the optical system (peripheral optical system) 30 may be referred to as a "peripheral lens." As shown in FIG. 1C, the outer surface of the circumferential protruding part 11 of the housing 10 and the plurality of lenses (first lenses) L1 exposed therefrom form the same (a common) curved surface. Although the first lens L1 of the optical system (peripheral optical system) 30 disclosed herein is cut in the longitudinal direction for the purpose of reducing its radius in the present embodiment, the shape of the first lens L1 is not limited thereto and it may be a circular or elliptical lens.

The hexagonal glass 60 may be a single member made of a material (glass material) that satisfies the refractive index n of n>1.51.

The hexagonal glass 60 includes an incident surface 61, on which the subject light beam from the front lens group 30F is incident, and an exit surface 62 from which the subject light beam that has passed through the hexagonal glass 60 exits toward the rear lens group 30R. The hexagonal glass 60 is provided with three pairs of the incident surface 61 and the exit surface 62 so as to correspond to the three optical systems 30 and imaging sensors 50 (the incident surfaces 61 and the exit surfaces 62 are alternately provided). An upper surface of the hexagonal glass 60 serves as an incident surface 63, on which a subject light beam from the optical system (end surface optical system) 20 is incident, and a lower surface of the hexagonal glass 60 serves as an exit surface 64 from which the subject light beam that has passed through the hexagonal glass 60 exits toward the imaging sensor (end surface imaging sensor) 40.

Each of the three incident surfaces 61 and each of the three exit surfaces 62 on the peripheral surface of the hexagonal glass 60 oppose each other. The upper incident surface 63 and the lower exit surface 64 of the hexagonal glass 60 oppose each other. The subject light beams passing through the three optical systems (peripheral optical systems) 30 each travel in a straight line through the inside of the hexagonal glass 60 (between each of the three incident surfaces 61 and each of the three exit surfaces 62). The subject light beam passing through the one optical system (end surface optical system) 20 travels in a straight line through the inside of the hexagonal glass 60 (between the incident surface 63 and the exit surface 64).

The incident surface 63 and the exit surface 64 of the hexagonal glass 60 may also be referred to as a "first surface" and a "second surface" other than the three incident surfaces 61 and the three exit surfaces 62.

The incident surface 61 (corresponding to the optical system 30) and the incident surface 63 (corresponding to the optical system 20) of the hexagonal glass 60 may respectively be referred to as a "first incident surface" and a "second incident surface" which are perpendicular to each other. The exit surface 62 (corresponding to the imaging sensor 50) and the exit surface 64 (corresponding to the imaging sensor 40) of the hexagonal glass 60 may respectively be referred to as a "first exit surface" and a "second exit surface" which are perpendicular to each other. In such case, the "first incident surface" and the "first exit surface" oppose each other and the "second incident surface" and the "second exit surface" oppose each other.

The incident surfaces 61, the exit surfaces 62, the incident surface 63 and the exit surface 64 of the hexagonal glass 60 may be polish-finished. Alternatively, the incident surfaces 61, the exit surfaces 62, the incident surface 63 and the exit surface 64 of the hexagonal glass 60 may be anti-reflection coated in order to prevent ghosting.

The subject light beams passing through the one optical system (end surface optical system) 20 and the three optical systems (peripheral optical systems) 30 intersect each other inside the hexagonal glass 60. By providing the hexagonal glass 60 serving as a common transmissive optical element shared by the one optical system (end surface optical system) 20 and the three optical systems (peripheral optical systems) 30 as described above, it is possible to secure a long total optical length to thereby achieve an excellent imaging performance (an increased resolution) and improve the space efficiency of the imaging device 1 to thereby achieve the size reduction of the imaging device 1.

A plane-parallel plate (plane-parallel glass) 65 is provided immediately before each of the three incident surfaces 61 of the hexagonal glass 60 in order to secure a long designed total optical length of the three optical systems (peripheral optical systems) 30. An aperture stop 66 is provided immediately after each of the three exit surfaces 62 of the hexagonal glass 60 in order to determine the aperture size of the optical systems 30.

In typical constraints in optical designing, the aperture stop 66 is required to be provided at a position of about ½ of the total optical length D0. However, in the present embodiment, the hexagonal glass 60 serving as the common transmissive optical element is provided at a position of about ½ of the total optical length D0. By providing the plane-parallel plate 65 on the incident surface 61 of the hexagonal glass 60, it is possible to secure a longer total optical length in addition to (in assisting in) the effect resulting from the provision of the hexagonal glass 60 on its own. The plane-parallel plate 65 causes the aperture stop 66 to be arranged at a position that does not block the optical path of each optical system, which is immediately after the exit surface 62 in the present embodiment.

As shown in FIG. 3, when, in the total optical length D0 of the optical system (peripheral optical system) 30, a distance from a surface on the object side of the front lens group 30F (first lens L1) to the hexagonal glass 60 is defined as D1 and a distance from a surface on the image side of the rear lens group 30R (eighth lens L8) to the hexagonal glass 60 is defined as D2, the relationship D1>D2 is satisfied. When a distance from the imaging sensor 50 or the imaging sensor holding substrate 51 holding the imaging sensor 50 to the hexagonal glass 60 is defined as D2', the relationship D2 D2' is satisfied. Such configuration allows the optical system (peripheral optical system) 30, the imaging sensor (peripheral sensor) 50 and the hexagonal glass 60 to be arranged with miniscule clearances therebetween on the inner side of the circumferential protruding part 11 of the housing 10, so that the size (diameter) of the imaging device 1 can be reduced.

FIG. 4 is a diagram showing a positional relationship between the optical systems (peripheral optical systems) 30, the imaging sensors (peripheral imaging sensors) 50 and the hexagonal glass 60 in an enlarged manner.

As shown in FIG. 4, the hexagonal glass 60 is located at the center of the inside of the circumferential protruding part 11 of the housing 10 and the three optical systems (peripheral optical systems) 30 and the three imaging sensors (peripheral imaging sensors) 50 are located about the hexagonal glass 60. When a virtual circle is defined along an outer shell in the circumferential direction of the circumferential protruding part 11 of the housing 10, the lenses L1 each located closest to the object in the three optical systems (peripheral optical systems) 30 and the three imaging sensors (peripheral imaging sensors) 50 are located on the virtual circle in an alternating manner in the circumferential direction (in a radial direction as viewed from the center). Since the three optical systems (peripheral optical systems) 30 share the hexagonal glass 60, they intersect each other in the total optical lengths D0 (see FIG. 3) of the respective three optical systems (peripheral optical systems) 30. Such configuration allows the optical systems (peripheral optical systems) 30, the imaging sensors (peripheral imaging sensors) 50 and the hexagonal glass 60 to be arranged with miniscule clearances therebetween on the inner side of the circumferential protruding part 11 of the housing 10, so that the size (diameter) of the imaging device 1 can be reduced.

As shown in FIGS. 3 and 4, the relationship A>120 is satisfied when the horizontal angle of view for each of the three optical systems (peripheral optical systems) 30 is defined as A(°).

FIG. 5 is a diagram showing, in an enlarged manner, a positional relationship between the optical system (end surface optical system) 20, the imaging sensor (end surface imaging sensor) 40, the optical system (peripheral optical system) 30, the imaging sensor (peripheral imaging sensor) 50 and the hexagonal glass 60.

As shown in FIG. 5, the hexagonal glass 60 is located at the center of the inside of the circumferential protruding part 11 of the housing 10 and the one optical system (end surface optical system) 20 and the one imaging sensor (end surface imaging sensor) 40 are located with the hexagonal glass 60 interposed therebetween in the vertical direction. When a virtual circle is defined along an outer shell in the circumferential direction of the circumferential protruding part 11 of the housing 10, the one optical system (end surface optical system) 20 and the one imaging sensor (end surface imaging sensor) 40 are located within the virtual circle. Since the one optical system (end surface optical system) 20 and the three optical systems (peripheral optical systems) 30 share the hexagonal glass 60, they intersect each other in the total optical lengths D0 of the respective optical systems. Such configuration allows the optical system (end surface optical system) 20, the imaging sensor (end surface imaging sensor) 40, the optical systems (peripheral optical systems) 30, the imaging sensors (peripheral imaging sensors) 50 and the hexagonal glass 60 to be arranged with miniscule clearances therebetween on the inner side of the circumferential protruding part 11 of the housing 10, so that the size (diameter) of the imaging device 1 can be reduced.

In the present embodiment, the optical system (end surface optical system) 20 for image capturing in the zenith direction is provided to improve image quality (i.e., to increase the resolution) in the zenith direction and the optical system (end surface optical system) 20 shares the hexagonal glass 60 with the optical systems (peripheral optical systems) 30. Specifically, while each of the optical systems (peripheral optical systems) 30 uses the incident surface 61 and the exit surface 62 (the first incident surface and the first exit surface) of the hexagonal glass 60, the optical system (end surface optical system) 20 uses the incident surface 63 and the exit surface 64 (the second incident surface and the second exit surface being perpendicular to the first incident surface and the second exit surface, respectively) of the hexagonal glass 60. Such configuration allows the size (diameter) of the imaging device 1 to be reduced.

As shown in FIG. 5, the vertical angle of view of the one optical system (end surface optical system) 20 is set to B(°). The vertical angle of view B(°) satisfies B>120. The relationship of magnitudes between the horizontal angle of view A(°) of the optical system (peripheral optical system) 30 and the vertical angle of view B(°) of the optical system (end surface optical system) 20 may be any of A>B, A=B, or A<B. When the horizontal angle of view A(°) of the optical system (peripheral optical system) 30 overlaps with the vertical angle of view B(°) of the optical system (end surface optical system) 20, image processing may be performed such that an image obtained by the optical system (peripheral optical system) 30 in the overlapped portion is discarded and an image obtained by the optical system (end surface optical system) 20 is used. On the other hand, for an image obtained by downward imaging by the optical system (peripheral optical system) 30, image processing may be performed such that the entire image is used without being discarded.

The three imaging sensors (peripheral imaging sensors) 50 each have a rectangular shape having longer side extending in parallel in the longitudinal direction (vertical direction) of the housing 10 and short sides extending in parallel in the direction (horizontal direction) perpendicular to the longitudinal direction of the housing 10. Since the first lens L1 of the optical system (peripheral optical system) 30 is cut into a shape that is long in the longitudinal direction, it has a large angle of view in the longitudinal direction and a small angle of view (e.g. >120°) in the direction perpendicular to the longitudinal direction (short direction). By cutting parts of overlapped portions between the first lenses L1, the diameter (size) can be reduced. Thus, the shape of the imaging sensor (peripheral imaging sensor) 50 is designed so as to have a shape that is long in the longitudinal direction in accordance with the shape of the optical system (peripheral optical system) 30.

Referring back to FIG. 2, a substrate (control substrate) 70 is arranged in the second region S2 of the imaging device 1 and the substrate 70 receives image signals output from the one imaging sensor (end surface imaging sensor) 40 and the three imaging sensors (peripheral imaging sensors) 50. The substrate 70 and the imaging sensors 40, 50 are electrically connected to each other by wiring members 71 of, for example, a flexible substrate.

The substrate 70 herein may refer to, for example, a portion excluding wiring members for connection to the optical systems 20, 30, a battery 80, etc., and including chips soldered on the substrate 70.

A USB charging unit 72 is provided in the second region S2 in the outer shell of the imaging device 1. The USB charging unit 72 laterally protrudes from the substrate 70 so as to be exposed from the outer shell in the second region S2. In the exposed portion, a charging state by the USC charging unit 72 may be displayed.

A power switch 73 and a shutter switch 74 are provided in the second region S2 in the outer shell of the imaging device 1, the power switch 73 and the shutter switch 74 serving as operation function units for the imaging device 1. The power switch 73 and the shutter switch 74 protrude laterally from the substrate 70 so as to be exposed from the outer shell in the second region S2. The imaging device 1 is turned ON or OFF in response to a user's operation of the power switch 73 and the imaging by the imaging device 1 starts or ends in response to a user's operation of the shutter switch 74. The power switch 73 and the shutter switch 74 may be arranged so as to be operable by, for example, a thumb of the user when the user grips the constant-diameter part (grip part) 13 of the housing 10.

As shown in FIG. 2, a battery 80 serving as power supply means is provided in the third region S3 of the imaging device 1. The battery 80 is electrically connected to the substrate 70 by a wiring member 75 of, for example, a flexible substrate. The battery 80 supplies electric power to the substrate 70 via the wiring member 75 and further supplies electric power to the imaging sensors 40, 50 via the wiring members 71. The battery 80 may directly supply electric power to the imaging sensors 40, 50, not via the substrate, the wiring members 71, 75, etc.

The battery 80 serving as power supply means may refer to, for example, a portion excluding wiring members for connection to the optical systems 20, 30, the substrate 70, etc.

As described above, in the present embodiment, the optical systems 20, 30 are arranged in the first region S1 of the imaging device 1, the substrate 70 is arranged in the second region S2 of the imaging device 1, and the battery (power supply means) 80 is arranged in the third region S3 of the imaging device 1. More specifically, the lens L1 located closest to the object in each of the plurality of optical systems is arranged in the first region S1, the substrate 70 is arranged in the second region S2 and the battery (power supply means) 80 is arranged in the third region S3. The first region S1 to the third region S3 do not overlap with each other in the direction perpendicular to the longitudinal direction of the housing 10. Further, the lens L1 located closest to the object in each of the plurality of optical systems, the substrate 70 and the battery (power supply means) 80 are arranged at positions that do not overlap with each other in the direction perpendicular to the longitudinal direction of the housing 10. The plurality of optical systems 20, 30, the substrate 70 and the battery (power supply means) 80 do not span more than one region (of the first region S1 to the third region S3). As described above, by arranging the components in the respective limited regions of the first region S1 to the third region S3, being the arrangement spaces inside the housing 10, the size (diameter) reduction of the imaging device 1 can be achieved.

In the present embodiment, the center of gravity of the imaging device 1 is set so as to be located on the lower side with respect to the middle in the vertical direction by holding the relatively light-weight lenses L1 in the first region S1 located on the upper end side of the housing 10 and holding the relatively heavy-weight battery (power supply means) 80 in the third region S3 located in the lower end side of the housing 10. With such configuration, even when the user accidentally drops the imaging device 1, the housing 10 will land on the lower end side (third region S3) of the housing 10 that holds the battery 80, rather than on the upper end side (first region S1) of the housing 10 from which the plurality of lenses L1 are exposed, and it is therefore possible to prevent damages (cracks in the lenses) to the imaging device 1.

Figure 6A:
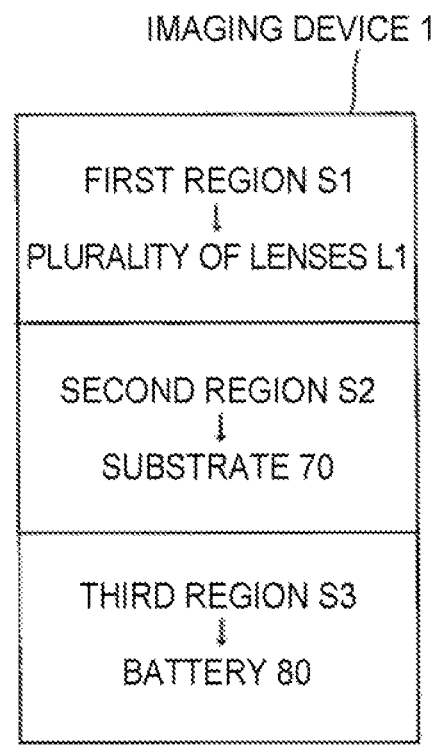
FIGS. 6A and B are conceptual diagrams each showing an example of components arranged in each region of a housing.
Figure 6B:
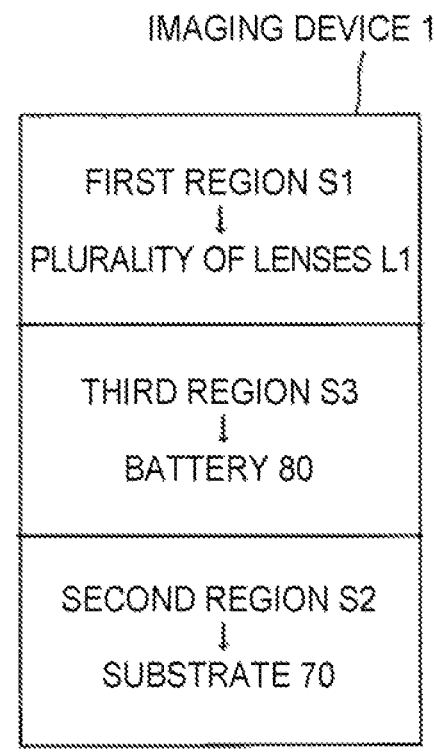

FIGS. 6A and 6B are conceptual diagrams each showing an example of components arranged in each region of the imaging device 1. FIG. 6A corresponds to FIG. 2, in which the upper end side (the one end side in the longitudinal direction) of the imaging device 1 is defined as the first region S1 where the plurality of lenses L1 is held, the middle part in the vertical direction (longitudinal direction) of the imaging device 1 is defined as the second region S2 where the substrate 70 is held, the lower end side (the other end side in the longitudinal direction) of the imaging device 1 is defined as the third region S3 where the battery 80 is held. FIG. 6B shows a modification example of FIG. 6A, in which, although the upper end side (the one end side in the longitudinal direction) of the imaging device 1 is defined as the first region S1 where the plurality of lens L1 is held as in the example of FIG. 6A, the lower end side (the other end side in the longitudinal direction) of the imaging device 1 is defined as the second region S2 where the substrate 70 is held and the middle part in the vertical direction (longitudinal direction) of the imaging device 1 is defined as the third region S3 where the battery 80 is held, unlike the example of FIG. 6A. In the example of FIG. 6B, since a long distance is secured between the plurality of lenses L1 held in the first region S1 and the power switch 73 and the shutter switch 74 serving as the operation function units which are held in the second region S2, it is possible to more effectively prevent a user's hand or finger from accidentally appearing in the obtained image. The power switch 73 and the shutter switch 74 serving as the operation function units are provided in the second region S2 of FIG. 6A and in the third region S3 of FIG. 6B, although they are not shown in these figures.

Figure 7:
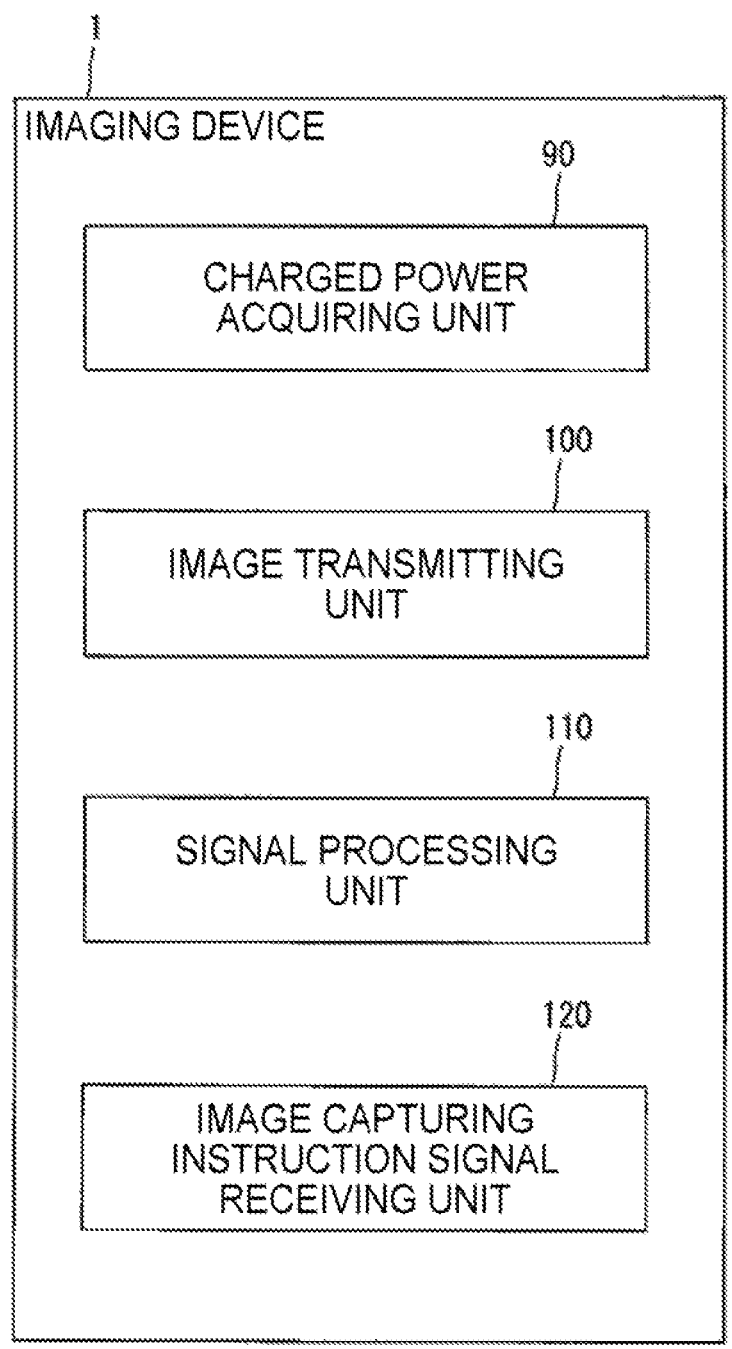
FIG. 7 is a functional block diagram showing an internal configuration of the imaging device according to the present embodiment.

FIG. 7 is a functional block diagram showing the internal configuration of the imaging device 1 according to the present embodiment. As shown in FIG. 7, the imaging device 1 includes a charged power acquiring unit 90, an image transmitting unit (transmission unit) 100, a signal processing unit 110 and an image capturing instruction signal receiving unit 120.

The charged power acquiring unit 90, the image transmitting unit 100, the signal processing unit 110 and the image capturing instruction signal receiving unit 120 may be, for example, constituted by chips formed on the substrate 70. In other words, the substrate 70 may include these functional blocks.

The charged power acquiring unit 90 may be, for example, constituted by an electrical contact or a power receiving unit provided in the downward protruding part 12 of the housing 10. When the housing 10 is set such that the downward protruding part 12 thereof is supported by a support part of a charger (not shown), the charged power acquiring unit 90 acquires charged power from the electrical contact or power sending unit (not shown) of the power charger. The charged power is supplied to the battery 80.

The image transmitting unit 100 transmits four image signals which have been input to the substrate 70 from the four imaging sensors 40, 50 to an external device (e.g. an external terminal such as a smartphone) (by wired or wireless transmission). The external device synthesizes the four image signals received from the image transmitting unit 100 to generate a omnidirectional image (e.g. an omnidirectional panorama image) or an semi-omnidirectional image. If the horizontal angle of view A(°) of the optical system (peripheral optical system) 30 and the vertical angle of view B(°) of the optical system (end surface optical system) 20 overlap with each other, the external device may perform image processing such that, in the overlapped portion, the image obtained by the optical system (peripheral optical system) 30 is discarded and the image obtained by the optical system (end surface optical system) 20 is used. On the other hand, the external device may perform image processing such that the entire downward image obtained by the optical system (peripheral optical system) 30 is used without being discarded.

The signal processing unit 110 performs signal processing for the four image signals which have been input to the substrate 70 by the four imaging sensors 40, 50. The signal processing unit 110 is capable of performing signal processing (image processing) similar to the above-mentioned signal processing (image processing) performed by the external device. Specifically, the signal processing unit 110 generates an omnidirectional image by synthesizing the four imaging signals that have been input to the substrate 70 by the four imaging sensors 40, 50. At this time, when the horizontal angle of view A(°) of the optical system (peripheral optical system) 30 and the vertical angle of view B(°) of the optical system (end surface optical system) 20 overlap with each other, the signal processing unit 110 may perform image processing such that, in the overlapped portion, the image obtained by the optical system (peripheral optical system) 30 is discarded and the image obtained by the optical system (end surface optical system) 20 is used. On the other hand, the signal processing unit 110 may perform image processing such that the entire downward image obtained by the optical system (peripheral optical system) 30 is used without being discarded. The signal processing unit 110 may perform at least part of the processing performed by the above-mentioned external device (e.g. an external terminal such as a smartphone).

The signal processing unit 110 may be realized as a chip formed on the substrate 70. For example, the signal processing unit 110 may be realized as an SoC (System on a Chip) in which various types of functional units, such as a CPU (Central Processing Unit) functional unit, a RAM (Random Access Memory) functional unit, a ROM (Read Only Memory) functional unit and a GPU (Graphics Processing Unit) functional unit, are embedded in a chip formed on the substrate 70.

The image capturing instruction signal receiving unit 120 receives an image capturing instruction signal from the external device (e.g. an external terminal such as a smartphone). The imaging processing by the imaging device 1 can be executed based on the image capturing instruction signal.

As described above, the imaging device 1 according to the present embodiment includes: the plurality of optical systems 20, 30; the plurality of imaging sensors 40, 50 on which images from the respective plurality of optical systems 20, 30 are formed; and the hexagonal glass 60, serving as a common transmissive optical element, that is located on the optical paths of the respective plurality of optical systems 20, 30, so as to transmit the subject light beams passing through the respective plurality of optical systems 20, 30. Further, the hexagonal glass 60 serving as the transmissive optical element has the first and second incident surfaces (61, 63) corresponding to the plurality of optical systems 20, 30, and the first and second incident surfaces (61, 63) are perpendicular to each other. With such configuration, it is possible to meet the needs for size reduction of an imaging device while maintaining excellent imaging performance.

The imaging device 1 according to the present embodiment includes the plurality of optical systems 20, 30 each including a plurality of lenses, the plurality of imaging sensors 40, 50 on which images from the respective plurality of optical systems 20, 30 are formed, the substrate 70 that receives image signals output from the plurality of imaging sensors 40, 50, and the battery 80 serving as the power supply means for supplying electric power to the plurality of imaging sensors 40, 50 and the substrate 70. The imaging device 1 has the first, second and third regions S1, S2 and S3 in the longitudinal direction, and the lens (first lens) L1 located closest to the object in each of the plurality of optical systems 20, 30 is arranged in the first region S1, the substrate 70 is arranged in the second region S2, and the battery (power supply means) 80 is arranged in the third region S3. In addition, the lens (first lens) L1 located closest to the object in each of the plurality of optical systems 20, 30, the substrate 70, and the battery (power supply means) 80 are arranged at positions that do not overlap with each other in the direction perpendicular to the longitudinal direction of the housing 10. In other words, the plurality of lenses L1, the substrate 70 and the battery 80 are arranged in the respective allocated regions so as not to span two regions. With such configuration, it is possible to meet the needs for size reduction of the imaging device 1.

Although the above embodiment illustrates an example in which the lower end surface (the other end surface) in the longitudinal direction of the housing 10 has the downward protruding part 12 having a rounded shape, the upper end surface (one end surface) in the longitudinal direction of the housing 10 may have an upward protruding part having a rounded shape. It may also be possible for both the downward protruding part and the upward protruding part to be provided.

The above embodiment illustrates an example in which one optical system (end surface optical system) 20 facing the upper surface of the housing 10 and one corresponding imaging sensor (end surface imaging sensor) 40 are provided, and three optical systems (peripheral optical systems) facing the peripheral surface of the housing 10 and three corresponding imaging sensors (peripheral imaging sensors) 50 are provided. However, the number of optical systems and imaging sensors provided in the imaging device 1 may be arbitrarily decided.

Although the above embodiment illustrates an example in which an omnidirectional image is obtained by the imaging device 1, other images, such as a panorama image, may be obtained other than the omnidirectional image. In such case, the vertical angle of view of each of the plurality of lenses L1 may be about 120°. It may also be possible to obtain an omnidirectional image with the imaging sensor (end surface imaging sensor) 40 corresponding to the optical system (end surface optical system) 20 removed (omitted), although the image quality in the upward direction would be slightly degraded.

The above embodiment illustrates an example in which the hexagonal glass 60 formed as a single member is used as the common transmissive optical element. However, the shape, etc. of the common transmissive optical element may be arbitrarily decided and various design modifications may be made. For example, the prism configuration of the glass serving as the common transmissive optical element may be changed depending on the numbers of optical systems and imaging sensors to be provided in the imaging device 1 (in such case, the number of incident surfaces and exit surfaces may also be changed depending on the prism configuration of the glass). Further, the common transmissive optical element may be formed by preparing a plurality of members and combining the members, instead of forming it as a single member.

The above embodiment illustrates an example in which the plane-parallel plate 65 is provided on the incident surface 61 of the hexagonal glass 60. However, the plane-parallel plate 65 may alternatively be provided on the exit surface 62 of the hexagonal glass 60. The plane-parallel plate 65 may alternatively be provided on each of the incident surface 61 and the exit surface 62 of the hexagonal glass 60. The plane-parallel plate 65 may be formed so as to have a very small curvature (a large radius of curvature) which is quite close to flat, instead of having a completely flat surface. Alternatively, the plane-parallel plate 65 may be omitted.

The above embodiment illustrates an example in which the substrate 70, as well as the power switch 73 and the shutter switch 74 serving as the operation function units, are provided in the second region S2 of the imaging device 1. However, the power switch 73 and the shutter switch 74 serving as the operation function units may be provided in the first region S1 or the third region S3 of the imaging device 1.

Figure 8:
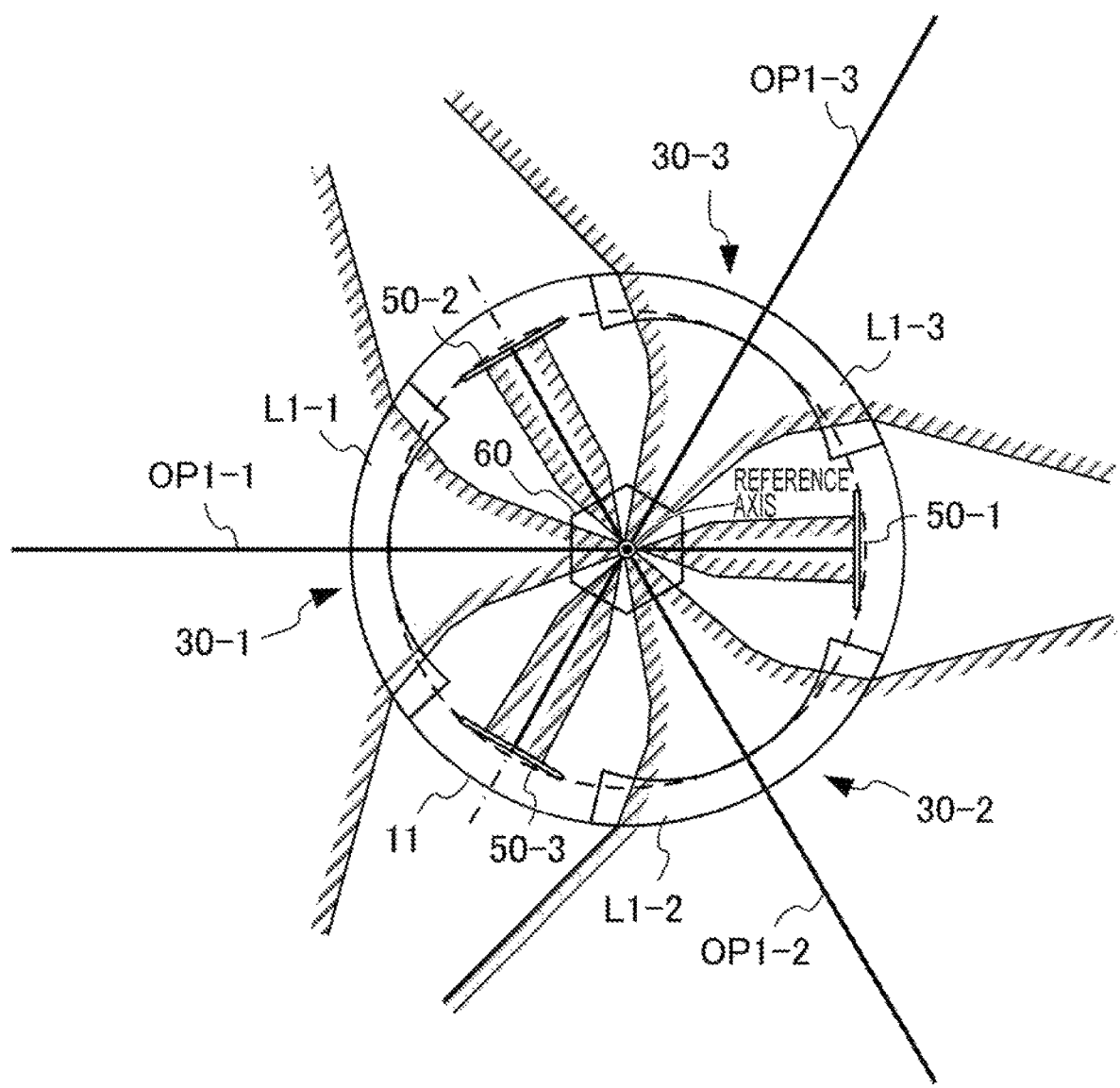
FIG. 8 is a diagram showing a positional relationship between optical paths of the peripheral optical systems and the peripheral imaging sensors, and the hexagonal glass, in an enlarged manner.

Supplementary explanation will now be provided below regarding the aforementioned embodiment. FIG. 8 shows the view of FIG. 4 in a simplified manner and FIG. 8 shows a positional relationship between a first optical path OP1, being the optical path of the peripheral optical system 30, a peripheral imaging sensor 50 and the hexagonal glass 60 in an enlarged manner. As stated above, three sets of peripheral optical systems 30 (30-1, 30-2 and 30-3) are radially arranged about the hexagonal glass 60 in the circumferential protruding part 11 of the housing 10. Although each of the peripheral optical systems 30 have the front lens group located on the object side with respect to the hexagonal glass 60 and the rear lens group located on the image side, FIG. 8 only shows peripheral lenses L1 (L1-1, L1-2 and L1-3) which are each arranged along the peripheral surface of the circumferential protruding part 11 and located closest to the object, while omitting the other lenses.

In the following description, while the circumferential protruding part 11 will be simply referred to as a "housing part" and the constant-diameter part 13 constituting a grip and the downward protruding part 12 located below the constant-diameter part 13 will be collectively referred to as a "second housing part," the term "first housing part" will also be used in some contexts. The housing part has a peripheral surface extending along a circumferential direction about a reference axis, which is the central axis of the hexagonal prism shape of the hexagonal glass 60. The peripheral lens L1 is fitted in an opening provided in the peripheral surface so that its lens surface on the object side forms part of the peripheral surface. It should be noted that the following description will illustrate an example in which the central axis of the hexagonal prism shape of the hexagonal glass 60 coincides with the reference axis of the housing part, the reference axis, being the central axis of the peripheral surface of the housing, may not coincide with the central axis of the hexagonal prism shape of the hexagonal glass 60.

The housing part contains three peripheral imaging sensors 50 (50-1, 50-2 and 50-3) corresponding to the respective peripheral optical systems 30 (30-1, 30-2 and 30-3). Specifically, a first peripheral optical system 30-1 forms a subject image on a light-receiving surface of a first peripheral imaging sensor 50-1, a second peripheral optical system 30-2 forms a subject image on a light-receiving surface of a second peripheral imaging sensor 50-2, and a third peripheral optical system 30-3 forms a subject image on a light-receiving surface of a third peripheral imaging sensor 50-3.

The peripheral optical systems 30 have respective first optical paths OP1 (OP1-1, OP1-2 and OP1-3) which paraxial rays travel along to the respective peripheral imaging sensors 50. Each of the first optical paths OP1 passes through the hexagonal glass 60 and reaches the corresponding peripheral imaging sensor 50. The three first optical paths OP1 (OP1-1, OP1-2 and OP1-3) intersect each other inside the hexagonal glass 60.

Although the optical path of the paraxial ray of the peripheral optical system 30 is herein employed as the first optical path OP1, the first optical path OP1 may be regarded as the path of the principal ray travelling from an arbitrary object point to the peripheral imaging sensor 50. Further, the feature of the first optical paths OP1 intersecting each other inside the hexagonal glass 60 is not limited to the state in which they share a common point in three dimensions and it is sufficient if they intersect each other as viewed from above as shown in the diagram. In other words, the first optical paths OP1 may be in a skewed position in three dimensions.

In the arrangement satisfying the above-mentioned relationship, the three peripheral lenses L1 (L1-1, L1-2 and L1-3) and the three corresponding peripheral imaging sensors 50 (50-1, 50-2 and 50-3) are alternately arranged along the circumferential direction about the reference axis (along the virtual circle shown by the dashed line in FIG. 8). Specifically, as viewed in the counterclockwise direction along the virtual circle, the peripheral lenses and the peripheral imaging sensors are arranged in the following order: the first peripheral lens L1-1→the third peripheral imaging sensor 50-3→the second peripheral lens L1-2→the first peripheral imaging sensor 50-1→the third peripheral lens L1-3→the second peripheral imaging sensor 50-2 (→the first peripheral lens L1-1). By employing such layout, the peripheral optical systems 30 and the peripheral imaging sensors 50 can be housed in a narrow space. It should be noted that the peripheral optical systems 30 and the peripheral imaging sensors 50 do not have to be arranged on a common circumference with respect to the reference axis and they may be circumferentially arranged along circles having different diameters.

Figure 9:
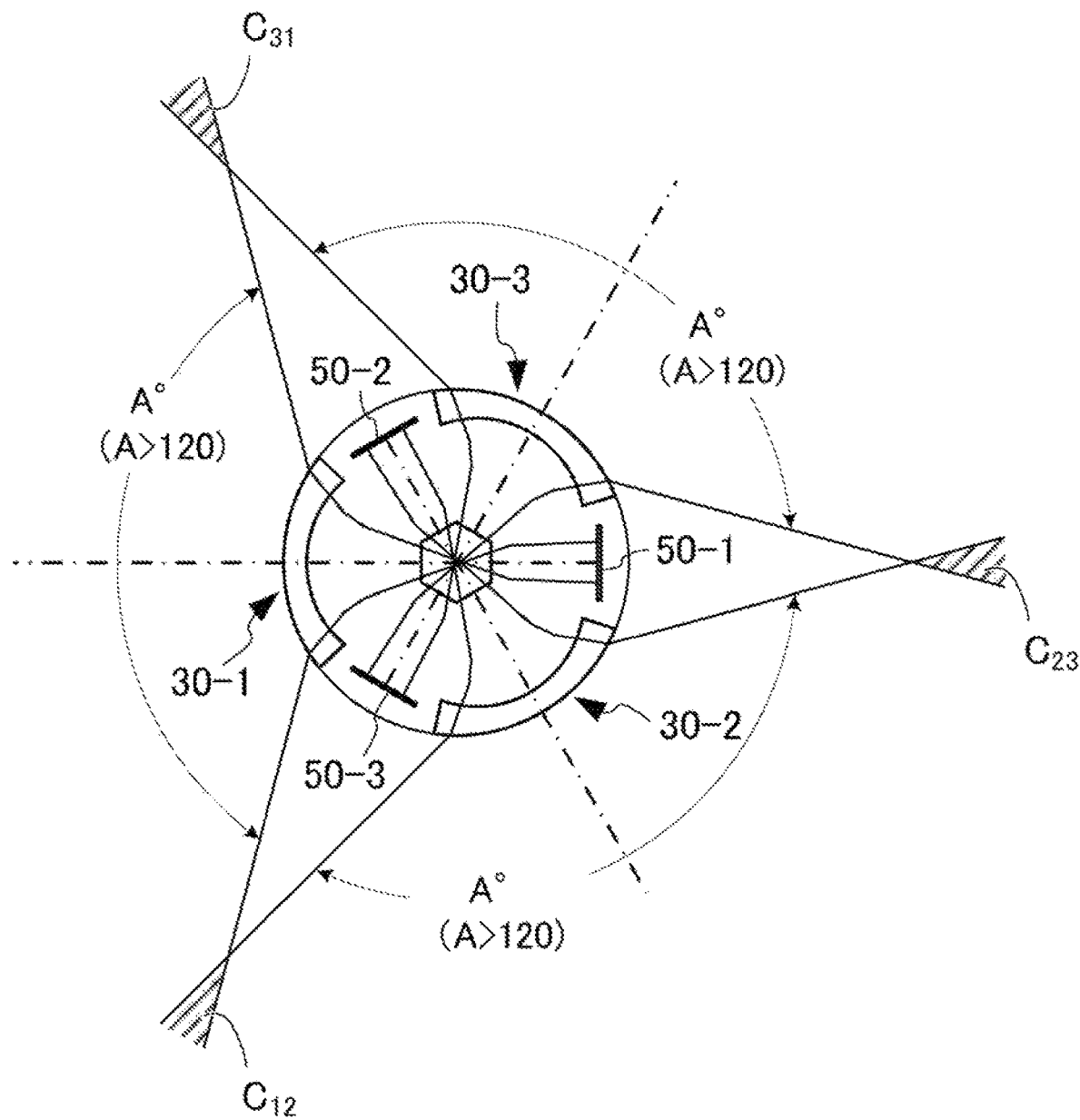
FIG. 9 is a diagram showing a relationship between circumferential angles of view of the peripheral imaging sensors.

FIG. 9 is a diagram showing a relationship between circumferential angles of view of the peripheral imaging sensors 50. FIG. 9 shows the view of FIG. 4 in a simplified manner, similarly to FIG. 8, and FIG. 9 shows the housing part in a bird's-eye view so that a subject area captured by each peripheral imaging sensor 50 can be seen.

As stated above, the circumferential angle of view A(°) of each peripheral imaging sensor 50 is set to be greater than 120° due to the combination of its effective pixel region and the peripheral optical system 30. With such setting, the circumferential angle of view A of one peripheral imaging sensor 50 consequently overlaps with the circumferential angle of view of the adjacent peripheral imaging sensor 50. More specifically, as shown in FIG. 9, the circumferential angle of view of the first peripheral imaging sensor 50-1 formed by the first peripheral optical system 30-1 overlaps with the circumferential angle of view of the second peripheral imaging sensor 50-2 formed by the second peripheral optical system 30-2 in an area $C_{12}$ and overlaps with the circumferential angle of view of the third peripheral imaging sensor 50-3 formed by the third peripheral optical system 30-3 in an area $C_{31}$. The circumferential angle of view of the second peripheral imaging sensor 50-2 formed by the second peripheral optical system 30-2 overlaps with the circumferential angle of view of the third peripheral imaging sensor 50-3 formed by the third peripheral optical system 30-3 in an area $C_{23}$.

By satisfying the above-mentioned relationships, the imaging device 1 can obtain the subject image through 360° by using the three peripheral imaging sensors 50. Images of the image signals output from the respective peripheral imaging sensors 50 have some distortion in the regions corresponding to the overlapping angles of view due to the aberration of the peripheral optical systems 30. Image processing for correcting such distortion in the images and combining the images together to obtain a synthesized image is performed by the signal processing unit 110 or an external device.

Figure 10:
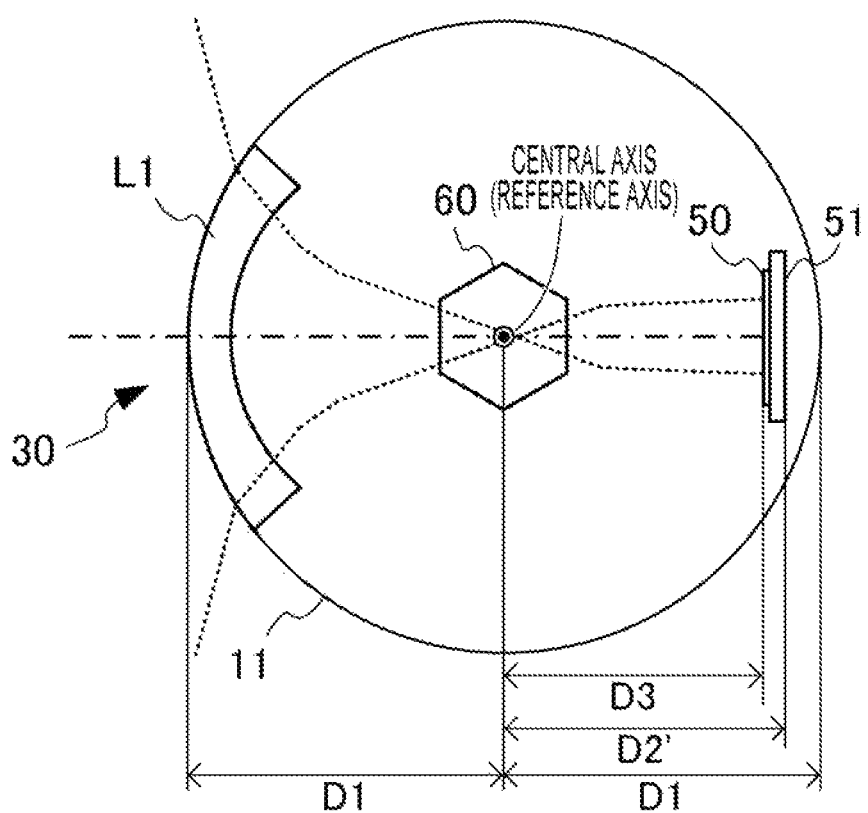
FIG. 10 is a diagram showing a positional relationship between a reference axis and a first lens L1 and a peripheral imaging sensor in an enlarged manner.

FIG. 10 is a diagram showing a positional relationship between the reference axis, the first lens L1 and the peripheral imaging sensor 50 in an enlarged manner and FIG. 10 shows the view of FIG. 3 in a simplified manner. It is only necessary to satisfy the positional relationship shown in FIG. 10 in order to arrange the peripheral optical systems 30, the peripheral imaging sensors 50, etc. about the hexagonal glass 60 in the housing part having a substantially circular shape with the object-side lens surface of each peripheral lens L1 serving as part of the peripheral surface of the housing part, as shown in the diagram. More specifically, a distance D1 of the optical path from the object-side lens surface (outer surface) of the peripheral lens L1 to the central axis of the hexagonal glass 60 is greater than a distance D3 of the optical path from the central axis to an imaging plane of peripheral optical system 30. In addition, the distance D1 is greater than a distance D2' from the central axis to a back surface of the imaging sensor holding substrate 51. Determining the optical design of the peripheral optical system 30 and the layout design of the substrate so as to satisfy such relationships allows for the diameter of the housing part to be reduced.

Figure 11:
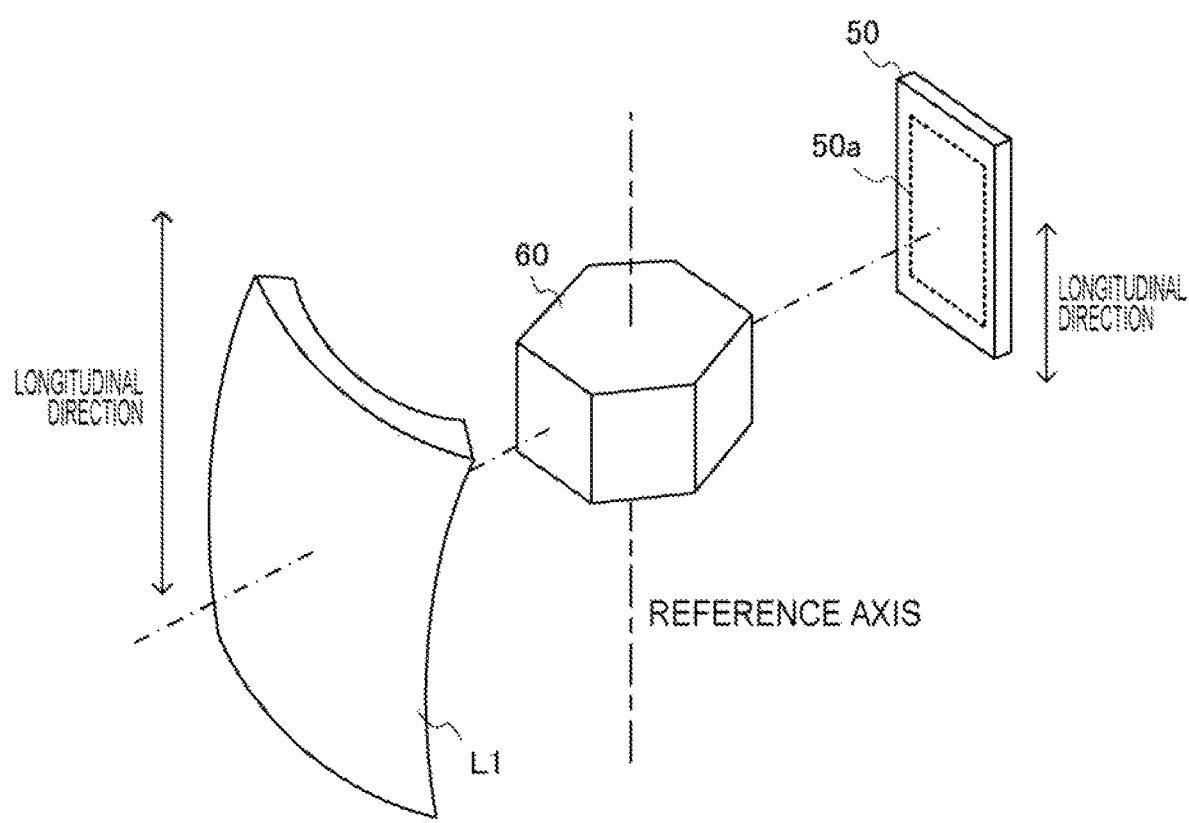
FIG. 11 is a perspective view illustrating an arrangement of the peripheral lens L1 and the peripheral imaging sensor.

FIG. 11 is a perspective view illustrating an arrangement of the peripheral lens L1 and the peripheral imaging sensor 50. As stated above, the peripheral lens L1 has a rectangular shape which is cut such that the sides in one direction are longer than the sides in the other direction as viewed from the front. The lens L1 is arranged along the peripheral surface of the housing part such that the longitudinal direction thereof is oriented along the reference axis of the housing part. By employing such shape and arrangement for each peripheral lens L1, it is possible to easily achieve the above-mentioned alternating arrangement of the three peripheral lenses L1 and the three peripheral imaging sensors 50 along the circumferential direction. It should be noted that the shape of the peripheral lens L1 as viewed from the front is not limited to being rectangular and any shape may be employed as long as it has a longitudinal direction and a short direction, such as an elliptic shape.

The peripheral imaging sensor 50 is arranged in the housing part such that the longitudinal direction of an effective pixel region 50a, being the pixel region in which an optical image is photoelectrically converted, extends along the reference axis. Although a more detailed description will be provided later, such arrangement can allow the peripheral imaging sensor 50 to have a greater angle of view in the direction along the reference axis than the circumferential angle of view.

Figure 12:
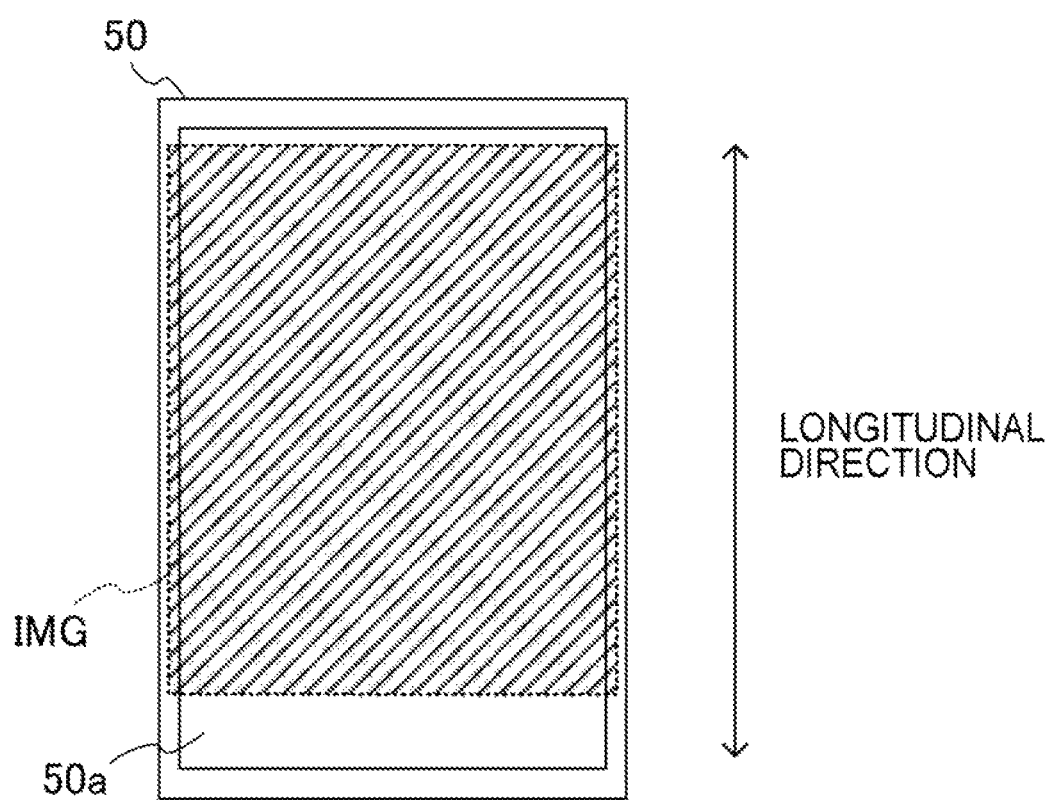
FIG. 12 is a diagram illustrating a relationship between an effective pixel region of the peripheral imaging sensor and a subject image formed by the peripheral optical system.

FIG. 12 is a diagram illustrating a relationship between the effective pixel region 50a of the peripheral imaging sensor 50 and a subject image IMG formed by the peripheral optical system 30. As shown in FIG. 12, the size of the subject image IMG is smaller than the effective pixel region 50a in the longitudinal direction along the reference axis, and is larger than the effective pixel region 50a in the circumferential direction. In other words, the peripheral optical system 30 forms the subject image on the light-receiving surface so as to have a size smaller than the effective pixel region 50a in the direction along the reference axis and larger than the effective pixel region 50a in the circumferential direction.

Since the circumferential angles of view of the adjacent peripheral imaging sensors 50 are determined by the effective pixel regions 50a and parts thereof overlap with each other as stated above, it is preferable for each subject image to slightly extend off the effective pixel region 50a in the circumferential direction. With the circumferential angles of view being determined in this way, the imaging device 1 can obtain the subject images through 360° in the circumferential direction. On the other hand, in order to secure as large an angle of view as possible in the reference axis direction, it is desired for the subject image to be utilized entirely to its boundary especially in the downward direction opposite to the zenith direction which is covered by the end surface optical system 20. The above-mentioned imaging relationship is employed from such viewpoint. More specifically, by arranging the effective pixel regions 50a and determining the optical design of the peripheral optical systems 30 so as to satisfy the above-mentioned imaging relationship, a large angle of view can be secured in the direction along the reference axis and the peripheral optical systems 30 and the peripheral imaging sensors 50 can be arranged in a layout along the circumferential direction.

Figure 13:
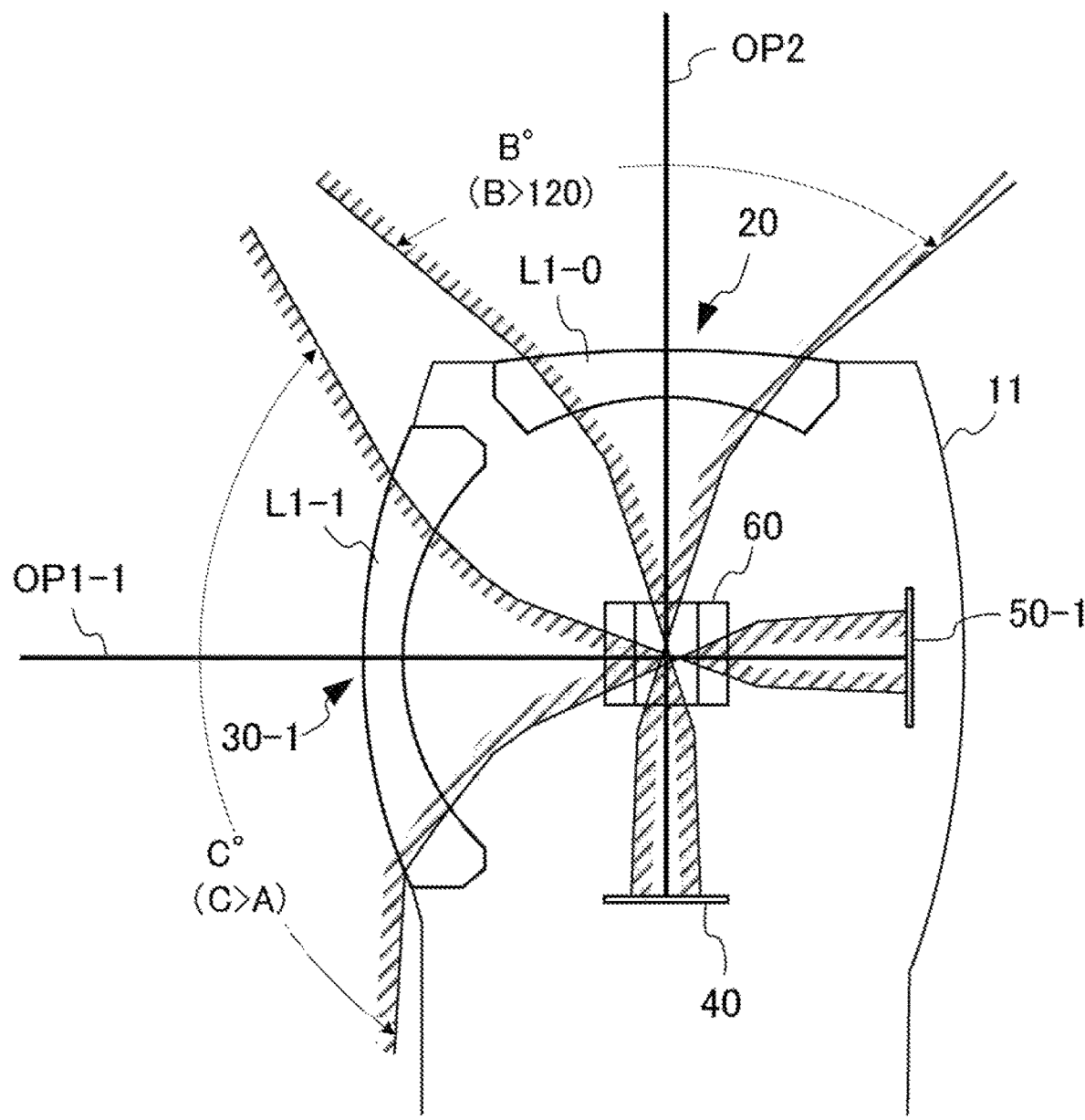
FIG. 13 is a diagram showing a positional relationship between the optical path of the peripheral optical system and the peripheral imaging sensor, the optical path of the end surface optical system and the end surface imaging sensor, and the hexagonal glass, in an enlarged manner.

FIG. 13 shows the view of FIG. 5 in a simplified manner and FIG. 13 is a diagram showing a positional relationship between the first optical path OP1 of the peripheral optical system 30 and the peripheral imaging sensor 50, a second optical path OP2 of the end surface optical system 20 and the end surface imaging sensor 40, and the hexagonal glass 60, in an enlarged manner. As stated above, the housing part houses the one end surface optical system 20 so as to extend along the vertical direction with the hexagonal glass 60 located at the center thereof. The end surface optical system includes a front lens group located on the object side with respect to the hexagonal glass 60 and a rear lens group located on the image side. However, FIG. 13 only shows an end surface lens L1-0 arranged along the end surface intersecting the reference axis and located closest to the object, while omitting the other lenses. It should be noted that, although the end surface lens L1-0 in the present embodiment is arranged along the end surface of the housing part, the housing part may have a cover glass for protecting the end surface glass L1-0 on the object side with respect to the end surface lens L1-0.

The housing part houses the end surface imaging sensor 40 so as to correspond to the end surface optical system 20. The end surface optical system 20 forms a subject image on a light-receiving surface of the end surface imaging sensor 40. The end surface optical system 20 has a second optical path OP2 which a paraxial ray travels along to the end surface imaging sensor 40. The second optical path OP2 passes through the hexagonal glass 60 and reaches the corresponding end surface imaging sensor 40.

Although the optical path of the paraxial ray of the end surface optical system 20 is herein employed as the second optical path OP2, the second optical path OP2 may be regarded as the path of the principal ray travelling from an arbitrary object point to the end surface imaging sensor 40.

Although the three peripheral optical systems 30 and the three peripheral imaging systems 50 are arranged in the radial direction in the housing part as stated above, FIG. 13 only shows the first peripheral optical system 30-1 and the first peripheral imaging sensor 50-1. As stated above, the first optical path OP1-1 passes through the hexagonal glass 60 and reaches the corresponding first peripheral imaging sensor 50-1. At this time, the first optical path OP1-1 intersects the second optical path OP2 inside the hexagonal glass 60 serving as the common transmissive optical element. Similarly, the first optical path OP1-2 intersects the second optical path OP2 inside the hexagonal glass 60 and the first optical path OP1-3 intersects the second optical path OP2 inside the hexagonal glass 60. Herein, the feature of the first optical paths OP1 (OP1-1, OP1-2 and OP1-3) intersecting the second optical path OP2 inside the hexagonal glass 60 is not limited to the state in which they share a common point in three dimensions and it is sufficient if they intersect each other as viewed from a lateral side as shown in the diagram. In other words, the first optical paths OP1 and the second optical path OP2 may be in a skewed position in three dimensions.

In the common transmissive optical element, it is preferable for incident surfaces on which the first optical paths OP1 (OP1-1, OP1-2 and OP1-3) are respectively incident, and an incident surface on which the second optical path OP2 is incident, to be perpendicular to each other. Further, it is preferable for exit surfaces from which the first optical paths OP1 (OP1-1, OP1-2 and OP1-3) respectively exit, and an exit surface from which the second optical path OP2 exits, to be perpendicular to each other. In addition, the transmissive optical element preferably has a pair of an incident surface and an exit surface so as to correspond, one-by-one, to each of the end surface optical system 20 and the peripheral optical systems 30. In other words, it is preferable for a pair of an incident surface and an exit surface to be provided so as to correspond to one optical system. In particular, the incident surface and the exit surface of each pair are preferably provided so as to oppose each other. From such viewpoint, the hexagonal glass 60 having the hexagonal prism shape is optimal as the transmissive optical element of the present embodiment. With the end surface optical system 20 and the peripheral optical systems 30 arranged about such hexagonal glass 60, subject images can easily be obtained in an omnidirectional manner.

In FIG. 5, the vertical angle of view B(°) of the end surface system 20 is B>120. Regarding the peripheral optical system 30, the angle of view in the direction along the reference axis is represented by A(°) in the same way as the circumferential angle of view, and it is A>120. The example of FIG. 13 assumes a configuration in which the peripheral lens L1 has a rectangular shape as stated above and the angle of view C(°) in the direction along the reference axis is set so as to be greater than the angle of view A.

By employing the relationship between the angles of view A and C as described above, the peripheral imaging sensor 50 can capture a subject located at a further lower position. Specifically, since the three peripheral imaging sensors 50 are arranged along the circumferential direction, it is only necessary for the circumferential angle of view A of each peripheral imaging sensor 50 to be greater than 120°. On the other hand, since the imaging device 1 does not have any optical system or corresponding imaging sensor oriented downward which is opposite to the zenith direction, a subject located on the lower side that can be imaged is limited by the area covered by the peripheral imaging sensor 50. Thus, in order to image a subject located at a further lower position, it is necessary to set a large angle of view C. Therefore, the angles of view are set so as to satisfy the relationship of C>A.

Since a subject in a certain area in the zenith direction can be captured by the end surface imaging sensor 40 using the end surface optical system 20, the area covered by the peripheral imaging sensor 50 may be tilted slightly downward within the scope where part of the angle of view B of the end surface imaging sensor 40 and part of the angle of view A of the peripheral imaging sensor 50 can overlap with each other. With such configuration, it is possible to capture a subject located at a further lower position without causing any loss in the subject image in the zenith direction. Although the relationship of B>120 is employed in the example shown in FIG. 13, the angle of view B may be set so as to be smaller than 120° if the peripheral optical system 30 has an angle of view capable of capturing a subject located at a further higher position.

In the present embodiment described above, the number of the peripheral optical systems 30 is not limited to three. The number of the peripheral optical systems 30 and the peripheral imaging sensors 50 may be increased as the size of the housing part permits. In such case, the shape of the transmissive optical element should be changed in accordance with the number of the peripheral optical systems 30. Further, the transmissive optical element (hexagonal glass 60) for shortening the optical path length may be omitted if the size of the housing part permits.

According to the present invention, it is possible to provide an imaging device and an imaging optical system capable of meeting the needs for size reduction while maintaining excellent imaging performance.

What is claimed is:

1. An imaging device, comprising:
a plurality of optical systems each forming an image of a subject;
a plurality of imaging sensors corresponding to the respective plurality of optical systems;
a housing part that houses the plurality of optical systems and the plurality of imaging sensors, the housing part having a peripheral surface along a circumferential direction about a reference axis, wherein:
at least two of the plurality of optical systems each have:
a peripheral lens arranged along the peripheral surface and located closest to an object; and
a first optical path, the first optical paths of the at least two optical systems intersecting each other; and
each of the peripheral lenses has a longitudinal direction, the peripheral lens being arranged along the peripheral surface such that the longitudinal direction extends along the reference axis; and
a transmissive optical element arranged on an optical path portion at which the first optical paths intersect each other, wherein a stop is provided immediately after each exit surface of the transmissive optical element;
wherein a first distance from a surface on an object side of the peripheral lens to the transmissive optical element is greater than a second distance from the central axis to an imaging plane of the optical system.

2. The imaging device according to claim 1, wherein the peripheral lenses and imaging sensors corresponding to the respective peripheral lenses are arranged along the circumferential direction in an alternating manner.

3. The imaging device according to claim 1, wherein, from among the plurality of imaging sensors, imaging sensors that correspond to the respective optical systems having the first optical paths have an angle of view in a direction along the reference axis that is greater than an angle of view in the circumferential direction.

4. The imaging device according to claim 3, wherein the angle of view in the circumferential direction overlaps with the angle of view in the circumferential direction of an adjacent imaging sensor.

5. The imaging device according to claim 3, wherein, from among the plurality of imaging sensors, the imaging sensors that correspond to the respective optical systems having the first optical paths are arranged in the housing part such that a longitudinal direction of an effective pixel region extends along the reference axis.

6. The imaging device according to claim 1, wherein:
the housing part has an end surface intersecting the reference axis; and
one of the plurality of optical systems has:
an end surface lens arranged so as to correspond to the end surface and located closest to an object; and
a second optical path that intersects the first optical path.

7. The imaging device according to claim 1, wherein the transmissive optical element comprises a first incident surface, a first exit surface, a second incident surface, and a second exit surface, wherein the first incident surface and first exit surface are perpendicular to the respective second incident surface and second exit surface.

8. The imaging device according to claim 7, further comprising a plane-parallel plate disposed immediately before each of incident surfaces.

9. The imaging device according to claim 1, further comprising an end surface optical system exposed from an upper surface of the housing, a part of the end surface optical system exposed from the upper surface of the housing having a substantially circular shape.

10. The imaging device according to claim 1, wherein the housing includes a housing part that houses the optical systems and the imaging sensors;
the housing includes a grip part extending in a housing longitudinal direction; and a longitudinal direction of each of the peripheral lenses extends along the reference axis that is aligned with the housing longitudinal direction.

11. The imaging device according to claim 1, wherein a first distance from a surface on an object side of the peripheral lens to the transmissive optical element is greater than a second distance from a surface on the image side of the peripheral lens to the transmissive optical element.

12. An imaging optical system, comprising:
a plurality of optical systems each forming an image of a subject on a corresponding one of a plurality of imaging sensors, wherein:
at least two of the plurality of optical systems each have:
a peripheral lens arranged along a peripheral surface of a housing that houses the plurality of optical systems and located closest to an object, the peripheral surface extending along a circumferential direction about a reference axis; and
a first optical path, the first optical paths of the at least two optical systems intersecting each other;
each of the peripheral lenses has a longitudinal direction, the peripheral lens being arranged along the peripheral surface such that the longitudinal direction extends along the reference axis; and
a transmissive optical element arranged on an optical path portion at which the first optical paths intersect each other, wherein a stop is provided immediately after each exit surface of the transmissive optical element;
wherein a first distance from a surface on an object side of the peripheral lens to the transmissive optical element is greater than a second distance from the central axis to an imaging plane of the optical system.

13. The imaging optical system of claim 12, wherein the transmissive optical element comprises a first incident surface, a first exit surface, a second incident surface, and a second exit surface, wherein the first incident surface and first exit surface are perpendicular to the respective second incident surface and second exit surface.

14. The imaging optical system of claim 13, further comprising a plane-parallel plate disposed immediately before each of incident surfaces.

15. The imaging optical system of claim 12, further comprising an end surface optical system exposed from an upper surface of the housing, a part of the end surface optical system exposed from the upper surface of the housing having a substantially circular shape.

16. The imaging optical system of claim 12, wherein the housing includes a housing part that houses the optical systems and the imaging sensors;
the housing includes a grip part extending in a housing longitudinal direction; and
a longitudinal direction of each of the peripheral lenses extends along the reference axis that is aligned with the housing longitudinal direction.

17. The imaging optical system of claim 12, wherein a first distance from a surface on an object side of the peripheral lens to the transmissive optical element is greater than a second distance from a surface on the image side of the peripheral lens to the transmissive optical element.

* * * * *